UNITED STATES PATENT OFFICE.

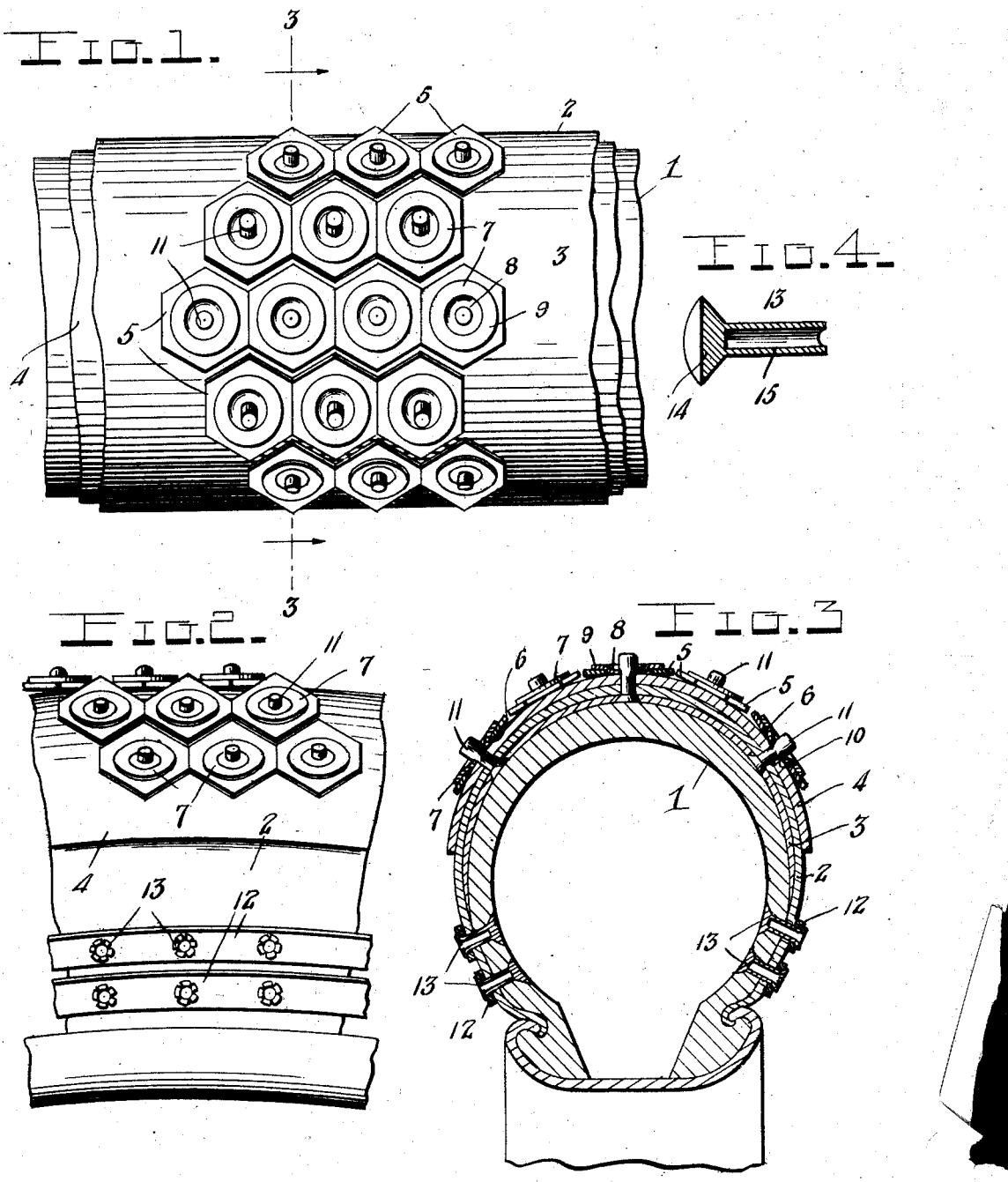

ISAAC J. D. FAIRHURST, OF ORFORDVILLE, WISCONSIN.

TIRE-COVER AND FASTENING MEANS THEREFOR.

No. 901,602.  Specification of Letters Patent.  Patented Oct. 20, 1908.

Application filed January 6, 1908. Serial No. 409,576.

*To all whom it may concern:*

Be it known that I, ISAAC J. D. FAIRHURST, a citizen of the United States, residing at Orfordville, in the county of Rock and State of Wisconsin, have invented certain new and useful Improvements in Tire - Covers and Fastening Means Therefor; and I do declare the following to be a full, clear, and exact description of the invention, such as will enable others skilled in the art to which it appertains to make and use the same.

This invention relates to new and useful improvements in anti-slipping tire covers for automobiles or other vehicle tires; and has for one of its objects to provide a simple and durable tire cover adapted to be easily and readily applied in position, whereby puncture of the tire is obviated and the wheels of the vehicle to which the invention is applied prevented from slipping or skidding when passing over smooth or uneven surfaces.

A second and particular object of the invention resides in the method of securing the tire cover or protector to the tire.

In the accompanying drawings,—Figure 1 is a top plan view of a portion of a tire cover constructed in accordance with the invention, applied to a section of a tire; Fig. 2 is a view in side elevation of Fig. 1; Fig. 3 is a transverse sectional view taken on the plane indicated by the dotted lines 3—3 of Fig. 1, looking in the direction indicated by the arrow; and Fig. 4 is a detail perspective view of one of the fastening rivets, the same being represented on an enlarged scale.

Referring to the drawings, which are for illustrative purposes only, and, therefore, not drawn to scale, the numeral 1 indicates a tire of any suitable form.

The numeral 2 indicates the cover of the tire, which may be of leather, rawhide, or other suitable material having a sufficient flexibility.

In carrying out the invention, a flexible strip 3 of leather, rawhide, or other suitable material, is arranged over the tread portion of the tire cover to provide an additional wearing surface at the tread portion of the tire and to facilitate in the attachment of the anti-skidding devices. These devices are arranged over the cover and comprise inner or base plates 5, of preferably hexagonal form, formed with central openings or apertures 6, which is shown here of circular form, said inner or base plates being arranged in contiguous relation to completely cover the strip 4 arranged over the tread portion of the tire cover. The outer plates 7 constitute burs, having central circular depressions or recesses 8, formed in their outer faces and corresponding outwardly extending portions 9 on their inner or under faces adapted to seat or fit in the openings or apertures of the inner or base plates 5, are arranged over said last mentioned plates. Said outer plates 7 are also provided with central apertures or perforations 10, the purpose of which will be disclosed. To fasten said flexible strip 4 and the plates 5 and 7, respectively, in position to the tire cover, rivets or fastening members 11 are employed and are arranged to extend through the flexible strips 3 and 4, respectively, and the tire cover 2; and also through the apertures in said plates. The bases of these rivets or fastening members are somewhat enlarged to engage or embrace the under surface or face of the flexible strip 3, while the outer or opposite ends of the rivets engage the outer plates and project a suitable distance beyond the same, said projecting portions constituting spurs designed to coact with the plates in providing anti-skidding means to prevent skidding or slipping of the vehicle to which the invention may be applied. It is to be particularly noted that by forming recesses or depressions in the outer plates 7, the rivets or fastening members cannot by any possibility become loosened until after said plates have become worn below said recesses.

A particular feature of the invention resides in the manner of attaching the tire cover or protector to the tire. As shown, two or more flexible fastening strips 12 of leather, rawhide or other suitable material are arranged on the outer face or surface of the tire cover at each side of the tire and to extend circumferentially entirely around the cover. These strips are fastened in position by fastening rivets 13, having flat base portions 14 and tubular body portions 15, the body portions being arranged to extend through the tire, the tire cover, and the fastening strips, the outer ends of the body portions projecting beyond the fastening members and being bent or crimped securely against the outer faces of the same.

By the above-defined arrangement a secure fastening means for a tire cover is provided, and liability of the rivets working loose is obviated. While but two strips have been shown at each side of the tire, it is evident that as many of these strips may be employed as may be found practicable.

From the foregoing description, taken in connection with the accompanying drawings, the construction and operation of the invention will be readily understood without requiring a more extended explanation.

Having described my invention, what I claim as new and desire to secure by Letters-Patent is:

In combination with a tire, a flexible cover arranged over the same, a flexible strip arranged over the tread portion of the tire under the cover, centrally apertured base plates arranged over the tread portion of the cover, outer plates formed with centrally apertured recessed portions arranged over the base plates with their recessed portions extending into the apertures thereof to points flush with the inner faces of the same and fastening rivets extending through the flexible strip, the tire cover and through the apertures of the base and outer plates, respectively, the outer ends of the rivets being slightly enlarged to engage the recessed portions of the outer plates and projecting beyond the same, a number of flexible fastening strips arranged at each side of and extending circumferentially around the cover, and means for securing the strips to the cover.

In testimony whereof I have hereunto set my hand in presence of two subscribing witnesses.

ISAAC J. D. FAIRHURST.

Witnesses:
 MATH. CANTINI,
 AARON FAIRHURST.